No. 760,239. PATENTED MAY 17, 1904.
H. B. OURSLER.
SCAFFOLD LADDER.
APPLICATION FILED SEPT. 29, 1903.
NO MODEL.

Witnesses
Inventor
H. B. Oursler
By
Attorneys

No. 760,239. Patented May 17, 1904.

UNITED STATES PATENT OFFICE.

HOWARD B. OURSLER, OF PITTSBURG, PENNSYLVANIA.

SCAFFOLD-LADDER.

SPECIFICATION forming part of Letters Patent No. 760,239, dated May 17, 1904.

Application filed September 29, 1903. Serial No. 175,049. (No model.)

*To all whom it may concern:*

Be it known that I, HOWARD B. OURSLER, a citizen of the United States, residing at East End, Pittsburg, in the county of Allegheny, State of Pennsylvania, have invented certain new and useful Improvements in Scaffold-Ladders; and I do hereby declare the following to be a full, clear, and exact description of the invention, such as will enable others skilled in the art to which it appertains to make and use the same.

This invention relates to scaffolds, and more particularly to that class known as "ladder-scaffolds," and has for its object to provide a device of this nature for use in connection with sand-blast scouring-machines which will prevent sand from falling to the ground and will furnish a protection from the sun, wind, and rain for the operators using the scaffold.

Figure 1:
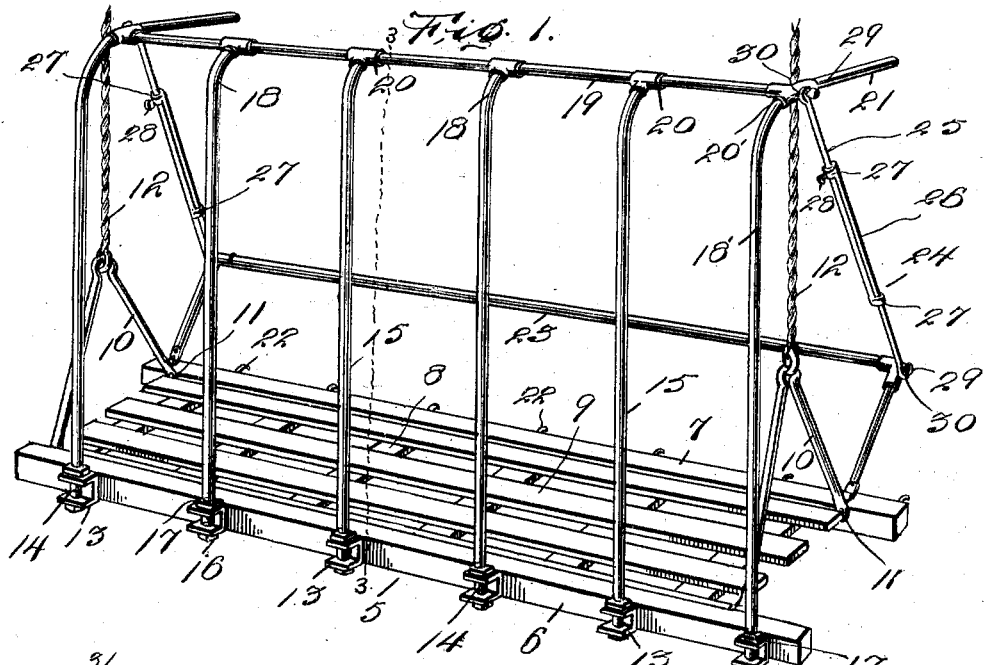
Figure 2:
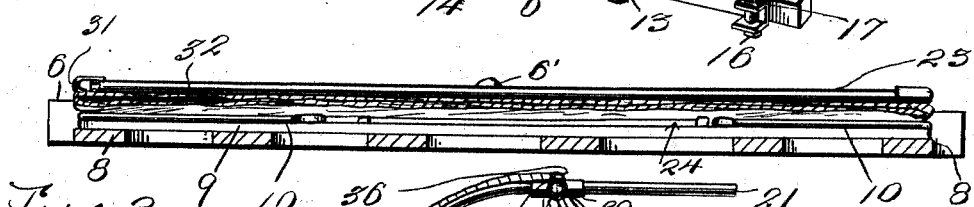
Figure 3:
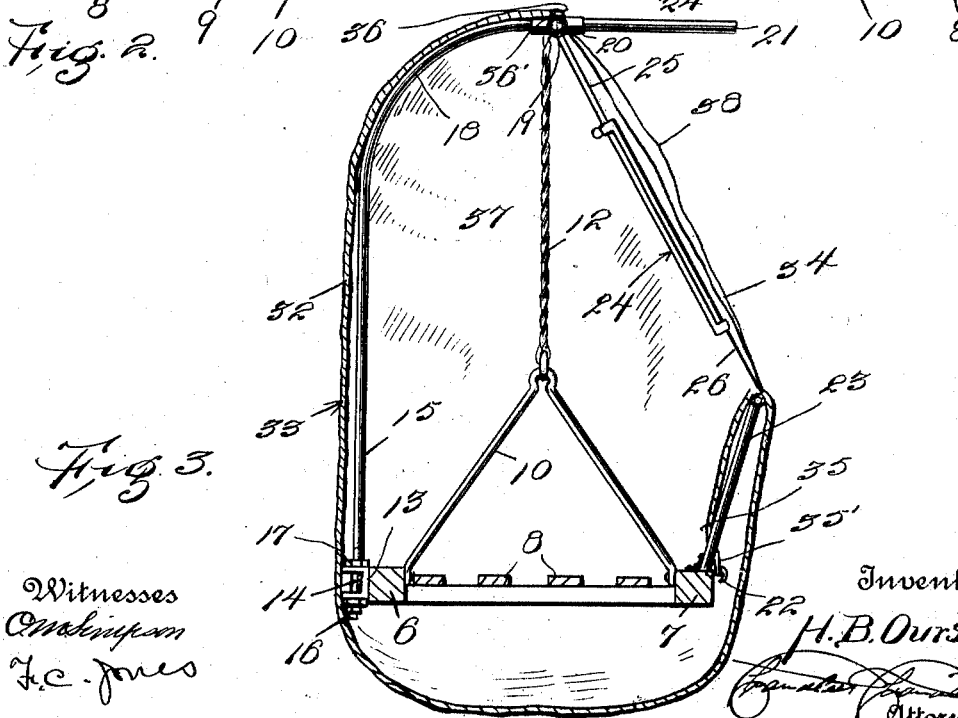

In the drawings forming a portion of this specification, and in which like numerals of reference indicate similar parts in the several views, Figure 1 is a view of the complete scaffold as applied to a building. Fig. 2 is a view of the device folded when not in use. Fig. 3 is a section on line 3 3 of Fig. 1.

Referring now to the drawings, the present invention comprises a slatted platform 5, the framework of which consists of sills 6 and 7, having connecting-rungs 8, upon which are disposed the slats 9. To either end of the platform yokes 10 are pivoted, as shown at 11, to which is attached the supporting-tackle 12 in the manner usually employed in ladder-scaffolds. To the outer face of the sills 6 are attached a plurality of sockets 13, which receive the ends 14 of uprights 15, which are threaded and secured in the sockets by means of nuts 16 and 17, as shown. The upper ends 18 of the uprights are bent forwardly over the ladder in an arc of substantially ninety degrees and are connected along their ends by a rod 19, which extends the entire length of the ladder. In practice it has been found that the uprights 15 and the rod 19 are best constructed of gas-pipe and connected with ordinary T's 20, and in the drawings the device is shown constructed in this way. The end uprights 18' are attached to the rod 19, with the third opening 20' of the T 20 forming a continuation of the end 18, and with this opening 20 is engaged the end of a supplemental rod 21, which extends forwardly with its end in a plane with the sill 7.

The sill 7 has a series of hooks 22 along its upper edge and has hinged to its upper outer corner a rectangular framework 23, which may be formed of gas-pipe, as shown, or any desired material. A pair of extensible supports 24 are disposed at either end of the device and are pivoted at one end to the end 18 of the upright 18' and at the other end to the free edge of the framework 23. These extensible supports each consist of a pair of rods 25 and 26, which have loops 27 at their ends, one rod passing through the loop of the other. A set-screw 28 is carried by one of the loops 27, by means of which the rods are secured in any relative position. It will thus be seen that the lengthening or shortening of the supports 24 will move the framework 23 upon its hinges. The pivotal connection of the supports 24 with the framework 23 and uprights 18' consists in each case of a thumb-screw 29, which is passed through the loop 30 on the end of each rod and is engaged with a threaded perforation 31 in the piping.

A canvas casing or hood 32 incloses the entire framework and ladder and consisting of a central portion 33, open throughout its entire length at 34, the edges of the openings being designated by the numerals 35 and 36. End pieces 37 are sewed to the ends of the central portions 33 and extend beyond the opening 34, resulting in a flap 38, as shown. The edge 36 of the central portion is provided with eyelets 36', and by means of these this edge is laced to the rod 19, the edge 35 being provided with eyelets 35', which are engaged with the hooks 22, the canvas casing thus inclosing the entire platform and framework. The flaps 38 of the ends 37 are attached to the rods 21. It will thus be seen that persons occupying the platform 5 will be protected at the back and both sides by the canvas, and at the front the opening 34 will give access to the wall or other surface to be treated. The framework 23 may be adjusted to bring its outer edge into contact with the surface to be cleaned to prevent sand and other materials from falling between the scaffold and the wall.

In practice modifications in the specific construction may be made and any suitable proportion may be used without departing from the spirit of the invention.

When not in use, the entire device may be folded compactly in the following manner: The supports 24 are disengaged from the framework 23 and the uprights 18' and are laid upon the platform 5. The yokes 10 after the tackle has been disengaged therefrom are folded down upon the platform, the uprights 15 and 18' removed from the sockets 13 and rod 19, and all are placed upon the platform. The canvas casing 33 is folded and laid upon the various parts just mentioned, and the framework 23 is folded down to lie upon the casing. In this position the outer edge of the framework 23 will lie against the sill 6, where it may be held by a catch 6', as shown.

What is claimed is—

1. A scaffold comprising a platform, a plurality of uprights secured to one edge of the platform, a canvas casing secured to the upper ends of the uprights and to the remaining edge of the platform and inclosing the platform and the uprights, and means for suspending the platform, said casing being adapted to receive and hold matter dropped from the platform.

2. A scaffold comprising a platform, a plurality of uprights secured to one edge of the platform and turned at right angles to themselves at their free ends, a framework hinged to the remaining edge of the platform and a canvas casing open at one side secured to the ends of the uprights at one edge and at the other to the second-mentioned side of the platform, said casing inclosing the entire device, and means for supporting the scaffold.

3. A scaffold comprising a platform, uprights removably attached to one edge of the platform, and having their upper ends toward the remaining edge of the platform, at right angles to themselves, a rod engaging the free ends of the uprights, rods secured to the first and last mentioned uprights to form a continuation thereof, a framework hinged to the second-named edge of the platform, adjustable rods connecting the framework with the end uprights to hold the framework at different points of movement upon its hinge, a canvas casing open along one side secured at one edge to the angular ends of the uprights and at the remaining edge to the second-named edge of the platform, and inclosing the entire device, the upper edges of the ends of the casing being secured for a portion of their lengths to the extension of the end uprights, and means for suspending scaffold.

4. A scaffold comprising a platform, a frame secured to the rearward edge of the platform and extending thereabove, a canvas covering attached at one end to the forward edge of the platform and at the opposite end to the upper edge of the frame, said covering lying below the platform and rearwardly of the frame to form a catcher, and means for supporting the scaffold.

5. In a scaffold, the combination with a platform, a frame secured to the platform and extending thereabove, and means for supporting the platform, of a canvas casing attached to the frame and to the platform and lying below the platform and rearwardly of the frame to form a catcher and to protect the scaffold.

In testimony whereof I affix my signature in presence of two witnesses.

HOWARD B. OURSLER.

Witnesses:
G. C. KENNEDY,
ANNIE H. MEERHOFF.